(12) United States Patent
Hu et al.

(10) Patent No.: US 10,486,402 B2
(45) Date of Patent: Nov. 26, 2019

(54) MULTILAYERED FILMS, METHODS OF MANUFACTURE THEREOF AND ARTICLES COMPRISING THE SAME

(71) Applicant: Dow Global Technologies LLC, Midland, MI (US)

(72) Inventors: Yushan Hu, Pearland, TX (US); Kim L. Walton, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 126 days.

(21) Appl. No.: 15/109,196

(22) PCT Filed: Dec. 22, 2014

(86) PCT No.: PCT/US2014/071848
§ 371 (c)(1),
(2) Date: Jun. 30, 2016

(87) PCT Pub. No.: WO2015/102991
PCT Pub. Date: Jul. 9, 2015

(65) Prior Publication Data
US 2016/0325534 A1 Nov. 10, 2016

Related U.S. Application Data

(60) Provisional application No. 61/922,200, filed on Dec. 31, 2013.

(51) Int. Cl.
| | | |
|---|---|---|
| B65D 65/40 | (2006.01) | |
| C08J 5/18 | (2006.01) | |
| C08J 7/04 | (2006.01) | |
| B32B 27/32 | (2006.01) | |
| B32B 27/08 | (2006.01) | |
| B32B 15/20 | (2006.01) | |
| B29C 48/00 | (2019.01) | |
| B29C 48/22 | (2019.01) | |
| B32B 7/12 | (2006.01) | |
| B32B 15/085 | (2006.01) | |
| B29C 43/30 | (2006.01) | |
| B32B 27/30 | (2006.01) | |
| B29K 21/00 | (2006.01) | |
| B29K 23/00 | (2006.01) | |
| B29L 7/00 | (2006.01) | |
| B29L 9/00 | (2006.01) | |

(52) U.S. Cl.
CPC ........... *B32B 27/32* (2013.01); *B29C 43/305* (2013.01); *B29C 48/022* (2019.02); *B29C 48/22* (2019.02); *B32B 7/12* (2013.01); *B32B 15/085* (2013.01); *B32B 15/20* (2013.01); *B32B 27/08* (2013.01); *B32B 27/308* (2013.01); *B65D 65/40* (2013.01); *C08J 5/18* (2013.01); *B29K 2021/00* (2013.01); *B29K 2023/00* (2013.01); *B29K 2023/08* (2013.01); *B29K 2023/14* (2013.01); *B29K 2995/0041* (2013.01); *B29L 2007/008* (2013.01); *B29L 2009/00* (2013.01); *B32B 2250/03* (2013.01); *B32B 2270/00* (2013.01); *B32B 2307/412* (2013.01); *B32B 2307/546* (2013.01); *B32B 2307/548* (2013.01); *B32B 2307/558* (2013.01); *B32B 2307/584* (2013.01); *B32B 2307/704* (2013.01); *B32B 2553/00* (2013.01); *C08J 7/04* (2013.01); *C08J 2323/08* (2013.01); *C08J 2423/08* (2013.01)

(58) Field of Classification Search
None
See application file for complete search history.

(56) References Cited

U.S. PATENT DOCUMENTS

| | | | |
|---|---|---|---|
| 3,645,992 | A | 2/1972 | Elston |
| 3,914,342 | A | 10/1975 | Mitchell |
| 4,076,698 | A | 2/1978 | Anderson et al. |
| 4,144,113 | A * | 3/1979 | Mori ................. C08K 3/16 156/334 |
| 4,429,079 | A | 1/1984 | Shibata et al. |
| 4,599,392 | A | 7/1986 | McKinney et al. |
| 5,272,236 | A | 12/1993 | Lai et al. |
| 5,278,272 | A | 1/1994 | Lai et al. |
| 5,324,800 | A | 6/1994 | Welborn, Jr. et al. |
| 5,328,760 | A | 7/1994 | Gillberg-Laforce |
| 5,504,172 | A | 4/1996 | Imuta et al. |
| 5,582,923 | A | 12/1996 | Kale et al. |
| 5,733,155 | A | 3/1998 | Sagawa |

(Continued)

FOREIGN PATENT DOCUMENTS

| | | |
|---|---|---|
| EP | 1318173 A1 | 6/2003 |
| JP | H05281665 A | 10/1993 |

(Continued)

OTHER PUBLICATIONS

US 5,693,387 A, 12/1997, Rosenbaum (withdrawn)

(Continued)

*Primary Examiner* — Sheeba Ahmed
(74) *Attorney, Agent, or Firm* — Cantor Colburn LLP (57) ABSTRACT

Disclosed herein is a multilayer film comprising a first layer and a second layer; and a tie layer; where the tie layer is disposed between the first layer and the second layer; the first layer being disposed on a first surface of the tie layer; the second layer being disposed on a second surface of the tie layer; where the second surface is oppositely disposed to the first surface; where the tie layer comprises a crystalline block composite and a carboxylated olefin copolymer.

12 Claims, 1 Drawing Sheet

(56) References Cited

U.S. PATENT DOCUMENTS

| | | | |
|---|---|---|---|
| 5,783,638 | A | 7/1998 | Lai et al. |
| 5,854,045 | A | 12/1998 | Fang et al. |
| 5,972,443 | A | 10/1999 | Breck et al. |
| 5,993,949 | A | 11/1999 | Rosenbaum |
| 6,254,944 | B1 | 7/2001 | Robert et al. |
| 6,525,157 | B2 | 2/2003 | Cozewith et al. |
| 6,727,000 | B2 | 4/2004 | Joly |
| 6,946,203 | B1 | 9/2005 | Lockhart |
| 6,960,635 | B2 | 11/2005 | Stevens et al. |
| 7,199,203 | B2 | 4/2007 | Stevens et al. |
| 7,335,424 | B2 | 2/2008 | Domine et al. |
| 7,405,008 | B2 | 7/2008 | Domine et al. |
| 8,106,139 | B2 | 1/2012 | Marchand et al. |
| 8,119,235 | B1 | 2/2012 | Vogel et al. |
| 8,802,774 | B2 | 8/2014 | Carnahan |
| 8,916,249 | B2 | 12/2014 | Liang |
| 2002/0182391 | A1 | 12/2002 | Migliorini et al. |
| 2004/0009360 | A1 | 1/2004 | Longo et al. |
| 2004/0121172 | A1 | 6/2004 | Hofmann |
| 2006/0057410 | A1 | 3/2006 | Saavedra |
| 2007/0004860 | A1 | 1/2007 | Leboeuf |
| 2007/0275219 | A1 | 11/2007 | Patel et al. |
| 2011/0082249 | A1 | 4/2011 | Shan et al. |
| 2011/0082257 | A1 | 4/2011 | Carnahan et al. |
| 2011/0082258 | A1 | 4/2011 | Walton et al. |
| 2011/0313106 | A1 | 12/2011 | Shan et al. |
| 2011/0313107 | A1 | 12/2011 | Shan et al. |
| 2011/0313108 | A1* | 12/2011 | Shan ............... C08L 23/10 525/95 |
| 2012/0060997 | A1 | 3/2012 | Mitchell et al. |
| 2012/0111407 | A1 | 5/2012 | Rummens |
| 2013/0095335 | A1 | 4/2013 | Hermel-Davidock |
| 2013/0177720 | A1 | 7/2013 | Liang |
| 2013/0303680 | A1 | 11/2013 | Weaver et al. |
| 2015/0231861 | A1 | 8/2015 | Hu et al. |
| 2015/0231862 | A1 | 8/2015 | Hu et al. |
| 2017/0008253 | A1 | 1/2017 | Su et al. |
| 2017/0008263 | A1 | 1/2017 | Hu et al. |

FOREIGN PATENT DOCUMENTS

| | | |
|---|---|---|
| JP | H10265751 A | 10/1998 |
| JP | 2000094604 A | 4/2000 |
| JP | 2001059028 A | 3/2001 |
| JP | 2004167823 A | 6/2004 |
| JP | 2009143118 A | 7/2009 |
| JP | 4953560 B2 | 6/2012 |
| WO | 0001745 A1 | 1/2000 |
| WO | 0038843 A1 | 7/2000 |
| WO | 2009015126 A1 | 1/2009 |
| WO | 2009114797 A1 | 9/2009 |
| WO | 2010008696 A1 | 2/2010 |
| WO | 2010033276 A2 | 3/2010 |
| WO | 2011149886 A1 | 12/2011 |
| WO | 2011163187 A1 | 12/2011 |
| WO | 2011163191 A1 | 12/2011 |
| WO | 2012044730 A1 | 4/2012 |
| WO | 2012044732 A1 | 4/2012 |
| WO | 2013003541 A1 | 1/2013 |
| WO | 2013003543 A1 | 1/2013 |
| WO | 2013090396 A1 | 6/2013 |
| WO | 2014043522 A1 | 3/2014 |

OTHER PUBLICATIONS

International Search Report for International Application No. PCT/US2014/071848; International Filing Date Dec. 22, 2014; Report dated Mar. 12, 2015 (4 pages).

International Search Report for International Application No. PCT/US2015/016536; International Filing Date Feb. 19, 2015; Report dated Apr. 29, 2015 (4 pages).

International Search Report for International Application No. PCT/US2015/016541; International Filing Date Feb. 19, 2015; Report dated Apr. 29, 2015 (4 pages).

International Search Report for International Application No. PCT/US2015/016607; International Filing Date Feb. 19, 2015; Report dated Jun. 16, 2015 (5 pages).

International Search Report for International Application No. PCT/US2015/016610; International Filing Date Feb. 19, 2015; Report dated Apr. 13, 2015 (5 pages).

International Search Report for International Application Serial No. PCT/CN2014/072260; International Filing Date Feb. 19, 2014; Report dated Oct. 10, 2014 (7 pages).

International Search Report for International Application Serial No. PCT/CN2014/072265; International Filing Date Feb. 19, 2014; Report dated Nov. 28, 2014 (8 pages).

John Dealy et al., "Rheometers for Molten Plastics" Published by Van Nostrand Reinhold Co. (1982) on pp. 97-99.

K.W. Dixon—J. Branderup, E. Immergut, E. Grulke, eds. "Decomposition Rates of Organic Free Radical Initiators" Polymer Handbook, 4th ed., Wiley, New York, 1999, Section II, pp. 1-76.

M. Shida et al. "Correlation of Low Density Polyethylene Rheological Measurments with Optical and Processing Properties" Polymer Engineering and Science, vol. 17, No. 11, p. 769-774 (1977).

Machine Translation of JP 2000-094604 (2000) 6 Pages.

Rosalind Juran, editor "Polypropylene" Modern Plastics Encyclopedia/89, mid Oct. 1988 Issue, vol. 65, No. 11, pp. 86-92.

Rudin, A., "Practical Aspects of Molecular Weight Measurements" Modern Methods of Polymer Characterization, John Wiley & Sons, New York (1991) pp. 103-112.

Written Opinion for International Application No. PCT/US2014/071848; International Filing Date Dec. 22, 2014; Report dated Mar. 12, 2015 (5 pages).

Written Opinion for International Application No. PCT/US2015/016536; International Filing Date Feb. 19, 2015; Report dated Apr. 29, 2015 (5 pages).

Written Opinion for International Application No. PCT/US2015/016541; International Filing Date Feb. 19, 2015; Report dated Apr. 29, 2015 (5 pages).

Written Opinion for International Application No. PCT/US2015/016607; International Filing Date Feb. 19, 2015; Report dated Jun. 16, 2015 (7 pages).

Written Opinion for International Application No. PCT/US2015/016610; International Filing Date Feb. 19, 2015; Report dated Apr. 13, 2015 (7 pages).

Written Opinion for International Application Serial No. PCT/CN2014/072260; International Filing Date Feb. 19, 2014; Report dated Oct. 10, 2014 (4 pages).

Written Opinion for International Application Serial No. PCT/CN2014/072265; International Filing Date Feb. 19, 2014; Report dated Nov. 28, 2014 (4 pages).

Zimm, G.H. and Stockmayer, W.H., J. "The Dimensions of Chain Molecules Containing Branches and Rings" Chem. Phys., 17, 1301 (1949).

Holden et al.(Translated by Fu, Zhifeng); "Thermoplastic Elastomer"; Chemistry Industry Press, 2000, p. 106-relevant portions translated.

Van Krevelen (Translated by Xu, Yuanze et al.); "Properties of Polymers: Their Estimation and Correlation with Chemical Structure"; Beijing Scientific Publishing Company; 1981; pp. 247-248-relevant portion translated.

Yu et al.; "Synthetic Resin and Plastic Performance Manual"; Beijing Mechanical Industry Publishing House; 2011, p. 64-relevant portion translated.

Dow; ATTANE SL 4102G Data Sheet; "Ultra Low Density Polyethylene Resin For Blown Films"; Technical Information—Blown Film Extrusion; 2 pages.

* cited by examiner

MULTILAYERED FILMS, METHODS OF MANUFACTURE THEREOF AND ARTICLES COMPRISING THE SAME

CROSS REFERENCE TO RELATED APPLICATION

This US National Stage application claims priority to International Application Serial No. PCT/US14/071848 filed on 22 Dec. 2014 which claims the benefit of U.S. Provisional Application Ser. No. 61/922,200, filed 31 Dec. 2013, the entire contents of which are hereby incorporated by reference.

BACKGROUND

This disclosure relates to multilayered films, methods of manufacture thereof and to articles comprising the same.

Polypropylene (PP) is often used in packaging industry in the form of films and containers for packaging food and non-food products. PP packages provide advantages of high stiffness, good clarity, and high temperature performance. PP or thermoplastic polyolefin (TPO) is frequently used in automotive industry for panels and parts. Such polymer panels and parts provide benefits of low weight, flexible styling and lower cost. However, limitations exist such as poor printability/paintability, poor scratch and mar resistance.

SUMMARY

Disclosed herein is a multilayer film comprising a first layer and a second layer; and a tie layer; where the tie layer is disposed between the first layer and the second layer; the first layer being disposed on a first surface of the tie layer; the second layer being disposed on a second surface of the tie layer; where the second surface is oppositely disposed to the first surface; where the tie layer comprises a crystalline block composite and a carboxylated olefin copolymer.

Disclosed herein too is a method of manufacturing a multilayer film comprising coextruding a multilayered film comprising a first layer and a second layer; and a tie layer; where the tie layer is disposed between the first layer and the second layer; the first layer being disposed on a first surface of the tie layer; the second layer being disposed on a second surface of the tie layer; where the second surface is oppositely disposed to the first surface; where the tie layer comprises a crystalline block composite and a carboxylated olefin copolymer; and blowing or casting or extrusion coating the multilayered film.

DETAILED DESCRIPTION

"Composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/α-olefin polymer" and "propylene/α-olefin polymer" are indicative of interpolymers as described below. It is noted that although a polymer is often referred to as being "made of" monomers, "based on" a specified monomer or monomer type, "containing" a specified monomer content, or the like, this is obviously understood to be referring to the polymerized remnant of the specified monomer and not to the unpolymerized species.

"Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Polyolefin", "polyolefin polymer", "polyolefin resin" and like terms mean a polymer produced from a simple olefin (also called an alkene with the general formula $C_nH_{2n}$) as a monomer. Polyethylene is produced by polymerizing ethylene with or without one or more comonomers, polypropylene by polymerizing propylene with or without one or more comonomers, etc. Thus, polyolefins include interpolymers such as ethylene-α-olefin copolymers, propylene-α-olefin copolymers, etc.

"Melting Point" as used here (also referred to a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak; many individual polyolefins will comprise only one melting point or peak.

The term "and/or" includes both "and" as well as "or". For example, the term A and/or B is construed to mean A, B or A and B.

Disclosed herein are multilayered films that can be used in automobile panels and that provide benefits of low weight, flexible styling and lower cost. The multilayered films also display good printability/paintability as well as good scratch and mar resistance, which makes them useful in automobile panels. The multilayered film comprises at least 3 layers, one of which is a tie layer that comprises a crystalline block composite (CBC), a carboxylated ethylene copolymer; and optionally a polyolefin based elastomer. The tie layer is used to bond a first layer that comprises polypropylene to a second layer (that is oppositely disposed to the first layer) that comprises an ethylene ionomer, an acrylic acid ethylene copolymer or a combination thereof.

Figure 1:
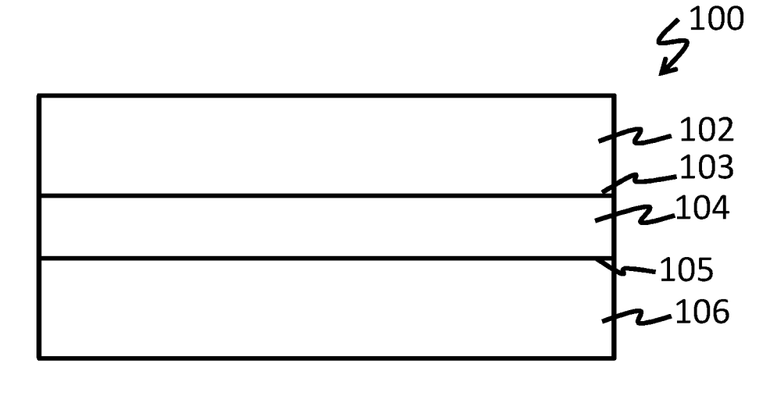
FIG. 1 is a schematic representation of the multilayered film.

With reference now to the FIG. 1, a multilayer film 100 comprises a first layer 102, a tie layer 104 and a second layer 106. The tie layer 104 comprises a first surface 103 and a second surface 105 that are oppositely disposed to each other. The first layer 102 contacts the tie layer 104 at the first surface 103, while the second layer 106 (that is opposely disposed to the first layer 102) contacts the tie layer 104 at the second surface 105.

As noted above, the tie layer 104 comprises a crystalline block composite (CBC), a carboxylated ethylene copolymer; and optionally a polyolefin based elastomer.

The term "crystalline block composite" (CBC) refers to polymers having three components: a crystalline ethylene based polymer (CEP) (also referred to herein as a soft polymer), a crystalline alpha-olefin based polymer (CAOP) (also referred to herein as a hard polymer), and a block copolymer comprising a crystalline ethylene block (CEB) and a crystalline alpha-olefin block (CAOB), wherein the CEB of the block copolymer is the same composition as the CEP in the block composite and the CAOB of the block copolymer is the same composition as the CAOP of the block composite. Additionally, the compositional split between the amount of CEP and CAOP will be essentially the same as that between the corresponding blocks in the block copolymer. When produced in a continuous process, the crystalline block composites desirably have a polydispersity index (PDI) from 1.7 to 15, specifically 1.8 to 10, specifically from 1.8 to 5, more specifically from 1.8 to 3.5. Such crystalline block composites are described in, for example, US Patent Application Publication Nos. 2011/0313106, 2011/0313108 and 2011/0313108, all published on Dec. 22, 2011, incorporated herein by reference with respect to descriptions of the crystalline block composites, processes to make them and methods of analyzing them.

CAOB refers to highly crystalline blocks of polymerized alpha olefin units in which the monomer is present in an amount greater than 90 mol %, specifically greater than 93 mol percent, more specifically greater than 95 mol percent, and specifically greater than 96 mol percent. In other words, the comonomer content in the CAOBs is less than 10 mol percent, and specifically less than 7 mol percent, and more specifically less than 5 mol percent, and most specifically less than 4 mol %. CAOBs with propylene crystallinity have corresponding melting points that are 80° C. and above, specifically 100° C. and above, more specifically 115° C. and above, and most specifically 120° C. and above. In some embodiments, the CAOB comprise all or substantially all propylene units. CEB, on the other hand, refers to blocks of polymerized ethylene units in which the comonomer content is 10 mol % or less, specifically between 0 mol % and 10 mol %, more specifically between 0 mol % and 7 mol % and most specifically between 0 mol % and 5 mol %. Such CEB have corresponding melting points that are specifically 75° C. and above, more specifically 90° C., and 100° C. and above.

In one embodiment, the crystalline block composite polymers comprise propylene, 1-butene or 4-methyl-1-pentene and one or more comonomers. Specifically, the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. Preferably, the monomer is propylene and the comonomer is ethylene.

Comonomer content in the crystalline block composite polymers may be measured using any suitable technique, with techniques based on nuclear magnetic resonance (NMR) spectroscopy preferred.

The block composites and crystalline block composites have a melting point Tm greater than 100° C. specifically greater than 120° C., and more specifically greater than 125° C. In an embodiment, the Tm is in the range of from 100° C. to 250° C., more specifically from 120° C. to 220° C. and also specifically in the range of from 125° C. to 220° C. Specifically the melt flow ratio (MFR) of the block composites and crystalline block composites is from 0.1 to 1000 dg/min, more specifically from 0.1 to 50 dg/min and more specifically from 0.1 to 30 dg/min.

In an embodiment, the block composites and crystalline block composites have a weight average molecular weight (Mw) from 10,000 to about 2,500,000 grams per mole (g/mole), specifically from 35000 to about 1,000,000 and more specifically from 50,000 to about 300,000, specifically from 50,000 to about 200,000 g/mole.

The crystalline block composite polymers comprise 0.5 to 95 wt % soft copolymer, from 0.5 to 95 wt % hard polymer and from 5 to 99 wt % block copolymer. More specifically, the crystalline block composite polymers comprise from 0.5 to 79 wt % soft copolymer, from 0.5 to 79 wt % hard polymer and from 20 to 99 wt % block copolymer and more specifically from 0.5 to 49 wt % soft copolymer, from 0.5 to 49 wt % hard polymer and from 50 to 99 wt % block copolymer. Weight percents are based on total weight of crystalline block composite. The sum of the weight percents of soft copolymer, hard polymer and block copolymer equals 100%.

In an embodiment, the crystalline block composite polymers comprises 0.5 to 95 wt % CEP, from 0.5 to 95 wt % CAOP and from 5 to 99 wt % block copolymer. More specifically, the crystalline block composite polymers comprise 0.5 to 79 wt % CEP, 0.5 to 79 wt % CAOP and 20 to 99 wt % block copolymer and more specifically 0.5 to 49 wt % CEP, 0.5 to 49 wt % CAOP and 50 to 99 wt % block copolymer. Weight percents are based on total weight of crystalline block composite. The sum of the weight percents of CEP, CAOP and block copolymer equals 100%.

In an embodiment, the block copolymers of the crystalline block composite comprise from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. More specifically, the block copolymers comprise 25 to 75 wt % CEB and 75 to 25 wt % CAOB, and even more specifically comprise 30 to 70 wt % CEB and 70 to 30 wt % CAOB.

In some embodiments, the crystalline block composites have a Crystalline Block Composite Index (CBCI) that is greater than zero but less than about 0.4 or from 0.1 to 0.3. In other embodiments, CBCI is greater than 0.4 and up to 1.0. In some embodiments, the CBCI is 0.1 to 0.9, from about 0.1 to about 0.8, from about 0.1 to about 0.7 or from about 0.1 to about 0.6. Additionally, the CBCI can be in the range of from about 0.4 to about 0.7, from about 0.5 to about 0.7, or from about 0.6 to about 0.9. In some embodiments, CBCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, CBCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

The crystalline block composite is present in an amount of 40 to 90 weight percent (wt %), specifically 45 to 85 wt %, and more specifically 50 to 75 wt %, based on the total weight of the tie layer 104.

The carboxylated olefin copolymer comprises an ethylene or propylene polymer that has grafted thereto an unsaturated carboxylic acid or an anhydride, ester, amide, imide or metal salt thereof, hereafter designated as "grafting compound". The grafting compound preferably is an aliphatic unsaturated dicarboxylic add or an anhydride, an ester, amide, imide or metal salt derived from such acid. The carboxylic acid preferably contains up to 6, more preferably up to 5 carbon atoms. Alkali metal salts are the preferred metal salts. Examples of unsaturated carboxylic acids are maleic acid, fumaric acid, itaconic add, acrylic acid, methacrylic acid, crotonic acid, and citraconic acid. Examples of derivatives of unsaturated carboxylic acids are maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, monomaleamide, dimaleamide, N,N-diethylmaleamide, N-monobutylmaleamide, N,N-dibutylmaleamide, monofumaramide, difumaramide, N-monoethylfumaramide, N,N-diethylfumaramide, N-monobutylfumaramide, N,N-dibutylfumaramide, maleimide, N-butylmaleimide, N-phenylmaleimide, sodium acrylate, sodium methacrylate, potassium acrylate, and potassium methacrylate. Glycidyl methacrylate is the preferred grafting compound. One or more, preferably one, grafting compound is grafted onto the ethylene or propylene polymer.

The content of the grafted compound in the ethylene or propylene polymer is in the range of 0.05, more specifically from 0.5, and most specifically from 2.0, to 30, specifically to 15, and most specifically to 8 weight percent, based on the total weight of the grafted ethylene or propylene polymer.

The graft process can be initiated by decomposing initiators to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). Alternatively, the grafting compound can be copolymerized with ethylene by typical tubular and autoclave processes.

The grafted ethylene polymer, as well as the ethylene polymer which is used for grafting, is selected from ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), or combinations thereof.

In an embodiment, the grafted ethylene or propylene polymer, as well as the ethylene or propylene polymer which is used for grafting, preferably have a density of up to 0.902 g/cm3, more preferably from 0.850 to 0.902 g/cm3, most preferably from 0.860 to 0.890 g/cm$^3$, particularly from 0.865 to 0.880 g/cm$^3$. However, it is to be understood that the polymer density changes slightly upon grafting. In the case of ethylene polymers, it has been found that the polymer density is important for providing a primer with sufficient mechanical strength and flexibility and for achieving a sufficient solubility of the grafted ethylene polymer in the organic solvent.

By the term "an ethylene or propylene polymer" is meant an ethylene polymer, a propylene polymer, a mixture of different ethylene polymers, a mixture of different propylene polymers or a mixture of at least one ethylene polymer and at least one propylene polymer. Preferred ethylene polymers and propylene polymers are described below. The ethylene or propylene polymer preferably has a crystallinity of from 5 to 35 percent, more preferably of from 10 to 20 percent.

The ethylene or propylene polymer can be an ethylene or propylene homopolymer or an interpolymer of propylene and at least one $C_4$-$C_{20}$-α-olefin and/or a $C_4$-$C_{18}$-diolefin. Preferably, the ethylene polymer is an interpolymer of ethylene and at least one $C_3$-$C_{20}$-α-olefin and/or a $C_4$-$C_{18}$-diolefin. Most preferably, the ethylene polymer is an interpolymer of ethylene and a $C_3$-$C_{20}$-α-olefin having a density of up to 0.902 g/cm$^3$. The term "interpolymer" as used herein refers to polymers prepared by the polymerization of at least two different monomers. The generic term interpolymer thus embraces copolymers, usually employed to refer to polymers prepared from two different monomers, and polymers prepared from more than two different monomers. The interpolymer can be a random or block interpolymer.

Preferred α-olefins contain 4 to 10 carbon atoms, of which 1-butene, 1-hexene, 4-methyl-1-pentene and 1-octene are the most preferred. Preferred diolefins are isoprene, butadiene, 1,4-pentadiene, 1,4-hexadiene, 1,5-hexadiene, 1,7-octadiene, 1, 9-decadiene, dicyclopentadiene, methylene-norbornene, and 5-ethylidene-2-norbornene. The interpolymers may contain other comonomers, such as a C2-C20 acetylenically unsaturated monomer.

The graft ethylene can comprise a random or block copolymer of ethylene and a C4-C10-α-olefin, most preferably a copolymer of ethylene and 1-butene, 1-hexene, 4-methyl-1-pentene, or 1-octene. The ethylene content is preferably more than 50 percent, more preferably from 60 to 90 percent, most preferably from 70 to 80 percent, based on the total weight of the polymer.

Known ethylene polymers can be used for grafting, which preferably have a density within the above-mentioned range. One useful type of ethylene polymers is a linear copolymer of ethylene and an α-olefin having at least four carbon atoms which has a narrow molecular weight distribution, a random distribution of comonomer units along the polymer backbone, and a homogeneity index of at least 75. Such polymers are described by Elston in U.S. Pat. No. 3,645,992. Other useful ethylene polymers and a process for producing them are described in U.S. Pat. No. 5,324,800. They have a weight average molecular weight of from 500 to 1,400,000, preferably from 1000 to 500,000 and a molecular weight distribution $M_w/M_n$ from 1.5 to 4.0. They are linear copolymers of ethylene and a $C_3$-$C_{20}$-α-olefin. Other useful ethylene polymers are described in U.S. Pat. No. 4,429,079. They are random copolymers of ethylene and an α-olefin having 3 to 10 carbon atoms which have a melt index of 0.1 to 50 g/10 minute, preferably 1 to 30 g/10 minute, a density of 0.870 to 0.900 g/cm$^3$, preferably 0.875 to 0.895 g/cm$^3$, a crystallinity by X-rays of 5 to 40 percent, preferably 7 to 30 percent, a melting point of 40° C. to 100° C., preferably 60° C. to 90° C., and an ethylene content of 85 to 95 mole percent. The ethylene polymers include those polymers available under the trademark TAFMER (Trademark of Mitsui Petrochemical) and EXACT (Trademark of Exxon Chemical), particularly those which have a density of up to 0.902 g/cm$^3$.

The most preferred interpolymers of ethylene and at least one $C_3$-$C_{20}$-α-olefin and/or a $C_4$-$C_{18}$-diolefin onto which an above-mentioned grafting compound is grafted are substantially linear ethylene polymers which have:
i) from 0.01 to 3 long chain branches per 1000 carbon atoms along the polymer backbone;
ii) a melt flow ratio, $I_{10}/I_2 \geq 5.63$;
iii) a molecular weight distribution, $M_w/M_n$, defined by the equation: $(M_w/M_n) \leq (I_{10}/I_2) - 4.63$, and
iv) a critical shear stress at the onset of gross melt fracture of greater than $4 \times 10^6$ dyne/cm$^2$ or a critical shear rate at the onset of surface melt fracture of at least 50 percent greater than the critical shear rate at the onset of surface melt fracture of a linear ethylene polymer having about the same melt index and $M_w/M_n$.

The substantially linear ethylene polymers and methods of preparing them are described in more detail in U.S. Pat. Nos. 5,272,236 and 5,278,272.

The substantially linear ethylene polymers have from 0.01, preferably from 0.05, to 3, and preferably to 1, long chain branches per 1000 carbon atoms along the polymer backbone. Long chain branching is defined herein as a chain length of at least about 6 carbon atoms, above which the length cannot be distinguished by carbon NMR spectroscopy. The long chain branch can be about as long as the polymer backbone. For ethylene/α-olefin copolymers, the long chain branch is at least one carbon longer than the short chain branch that results from the incorporation of the α-olefin(s) into the polymer backbone. The empirical effect of the presence of long chain branching in the substantially linear ethylene/α-olefin copolymers is manifested as enhanced rheological properties.

There are known techniques useful for determining the presence of long chain branches in ethylene polymers, including ethylene/1-octene copolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, Zimm, G. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to the term "substantially linear", the term "linear" means that the polymer lacks measurable or demonstrable long chain branches, that is, the polymer is substituted with an average of less than 0.01 long branches/1000 carbons.

By "melt index" or "$I_2$" is meant the melt index as measured in accordance with ASTM D-1238, Condition 190° C./2.16 kg. "$I_{10}$" is measured in accordance with ASTM D-1238, Condition 190° C./10 kg. The melt index $I_2$ of the substantially linear ethylene polymer is generally from 0.01 g/10 minute to 1000 g/10 minute, preferably from 0.01 g/10 minute to 100 g/10 minute. The melt flow index ratio, that is, the I10/I2, is at least 5.63, preferably at least 6, more preferably at least 7, and is essentially independent of the polydispersity index, in contrast to conventional polyethylenes which show a dependence of the melt flow index on the polydispersity index.

The polydispersity index of the substantially linear ethylene polymers (that is, the molecular weight distribution, or the ratio of the weight average molecular weight to the number average molecular weight (Mw/Mn)), as determined by gel permeation chromatography is defined by the equation: $(Mw/Mn) \leq (I10/I2) - 4.63$. The polydispersity index preferably is less than 3.5, more preferably from 1.5 to 2.5.

Furthermore, substantially linear ethylene polymers, specifically substantially linear ethylene polymers, have a critical shear stress at the onset of gross melt fracture, as determined by gas extrusion rheometry, of greater than $4 \times 10^6$ dynes/cm$^3$, or a gas extrusion rheology such that the critical shear rate at the onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within 10 percent of the corresponding values for substantially linear ethylene polymer and wherein the respective critical shear rates of the substantially linear ethylene polymer and the linear ethylene polymer are measured at the same melt temperature using a gas extrusion rheometer.

Determination of the critical shear rate and the critical shear stress in regards to melt fracture as well as other rheology properties is performed using a gas extrusion rheometer (GER). The gas extrusion rheometer is described by M. Shida, R. N. Shroff and L. V. Cancio in Polymer Engineering Science, Vol. 17, No. 11, p. 770 (1977), and in "Rheometers for Molten Plastics" by John Dealy, published by Van Nostrand Reinhold Co. (1982) on pp. 97-99.

The substantially linear ethylene polymer has a single differential scanning calorimetry, DSC, melting peak between −30° C. and 150° C. The single melting peak may show, depending on equipment sensitivity, a "shoulder" or a "hump" on the low melting side that constitutes less than 12 percent, typically less than 9 percent, and more typically less than 6 percent, of the total heat of fusion of the polymer.

The carboxylated-olefin copolymer is present in an amount of 30 to 60 weight percent (wt %), specifically 35 to 55 wt %, based on the total weight of the tie layer 104.

The tie layer 104 may also comprise in addition to the crystalline block composite (CBC) and the carboxylated-olefin copolymer, an optional elastomer. The optional elastomer can be an ethylene-α-olefin copolymer (which is already detailed above), a polyolefin elastomer (e.g., a propylene based elastomer), a vinyl aromatic block copolymer, or the like, or a combination comprising at least one of the foregoing elastomers.

The polyolefin elastomers may also comprise random or block propylene polymers (i.e., polypropylenes). The random polypropylene elastomer typically comprises 90 or more mole percent units derived from propylene. The remainder of the units in the propylene copolymer is derived from units of at least one α-olefin.

The α-olefin component of the propylene copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, and the like) are α-olefins for purposes of this invention. Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

In one embodiment the random polypropylene copolymer has a $T_m$ greater than 120° C., and/or a heat of fusion greater than 70 J/g (both measured by DSC) and preferably, but not necessarily, made via Ziegler-Natta catalysis.

In another embodiment, the polyolefin elastomer is a propylene-α-olefin interpolymer and is characterized as having substantially isotactic propylene sequences. The propylene-α-olefin interpolymers include propylene-based elastomers (PBE). "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

The propylene-α-olefin copolymer comprises units derived from propylene and polymeric units derived from one or more α-olefin comonomers. Exemplary comonomers utilized to manufacture the propylene-α-olefin copolymer are C2 and C4 to C10 α-olefins; for example, C2, C4, C6 and C8 α-olefins.

The propylene-α-olefin interpolymer comprises 1 to 40 percent by weight of one or more alpha-olefin comonomers. All individual values and sub-ranges from 1 to 40 weight percent are included herein and disclosed herein. The propylene-α-olefin interpolymer may have a melt flow rate in the range of 0.1 to 500 grams per 10 minutes (g/10 min), measured in accordance with ASTM D-1238 (at 230° C./2.16 Kg). The propylene-α-olefin interpolymer has crystallinity in the range of from at least 1 percent by weight (a heat of fusion ($H_f$) of at least 2 Joules/gram (J/g)) to 30 percent by weight (a $H_f$ of less than 50 J/g). The propylene-α-olefin interpolymer has a density of typically less than 0.895 g/cm$^3$. The propylene-α-olefin interpolymer has a melting temperature ($T_m$) of less than 120° C. and a heat of fusion ($H_f$) of less than 70 Joules per gram (J/g) as measured by differential scanning calorimetry (DSC) as described in U.S. Pat. No. 7,199,203. The propylene-α-olefin interpolymer has a molecular weight distribution (MWD), defined as weight average molecular weight divided by number average molecular weight (Mw/Mn) of 3.5 or less; or 3.0 or less; or from 1.8 to 3.0.

Such propylene-α-olefin interpolymers are further described in the U.S. Pat. Nos. 6,960,635 and 6,525,157, the entire contents of which are incorporated herein by reference. Such propylene-α-olefin interpolymers are commercially available from The Dow Chemical Company, under the trade name VERSIFY™, or from ExxonMobil Chemical Company, under the trade name VISTAMAXX™.

The term vinyl aromatic block copolymer means a polymer having at least one block segment of a vinyl aromatic monomer in combination with at least one saturated or unsaturated elastomeric monomer segment, and more preferably not having a block of polymer that is neither elastomeric nor vinyl aromatic. Examples of vinyl aromatic block copolymers are "styrene block copolymer or styrenic block copolymer". The term "styrene block copolymer" or "styrenic block copolymer" means a polymer having at least one block segment of a styrenic monomer in combination with at least one saturated or unsaturated elastomer (rubber) monomer segment, and more preferably not having a block of polymer that is neither rubber or styrenic. Suitable styrene block copolymers having unsaturated rubber monomer units include styrene-butadiene (SB), styrene-isoprene (SI), styrene-butadiene-styrene (SBS), styrene-isoprene-styrene (SIS), α-methylstyrene-butadiene-α-methylstyrene, α-methylstyrene-isoprene-α-methylstyrene, and the like.

The term "styrene butadiene block copolymer" is used herein inclusive of SB, SBS and higher numbers of blocks of styrene (S) and butadiene (B). Similarly, the term "styrene isoprene block copolymer" is used inclusive of polymers having at least one block of styrene and one of isoprene (I). The structure of the styrene block copolymers can be of the linear or radial type, and of the diblock, triblock or higher block type. In some embodiments, the styrenic block copolymers having at least four different blocks or a pair of two repeating blocks, for example, repeating styrene/butadiene or styrene/ethylene propylene blocks, are desirable. Styrene block copolymers are commercially available from Dexco Polymers under the trademark VECTOR®, from KRATON Polymers under the trademark KRATON™, from Chevron Phillips Chemical Co. under the trademark SOLPRENE™ and K-Resin, and from BASF Corp. under the trade designation STYROLUX™. The styrene block copolymers are optionally used singly or in combinations of two or more.

The styrenic portion of the block copolymer is preferably a polymer or interpolymer of styrene or its analogs or homologs, including α-methylstyrene, and ring-substituted styrenes, particularly ring-methylated styrenes. Preferred styrenics are styrene and α-methylstyrene, with styrene being especially preferred.

The elastomer portion of the styrenic block copolymer is optionally either unsaturated or saturated. Block copolymers with unsaturated elastomer monomer units may comprise homopolymers of butadiene or isoprene and copolymers of one or both of these two dienes with a minor amount of styrenic monomer. When the monomer employed is butadiene, it is preferred that between about 35 and about 55 mole percent of the condensed butadiene units in the butadiene polymer block have a 1,2-configuration. When such a block is hydrogenated, the resulting product is, or resembles, a regular copolymer block of ethylene and 1-butene (EB). If the conjugated diene employed is isoprene, the resulting hydrogenated product is or resembles a regular copolymer block of ethylene and propylene (EP). Preferred block copolymers have unsaturated elastomer monomer units, more preferably including at least one segment of a styrenic unit and at least one segment of butadiene or isoprene, with SBS and SIS most preferred. Among these, SIS is preferred because it has been found to be particularly effective to compatibilize polypropylene with other polymers in the composition. Furthermore, it is preferred because of a lower tendency to crosslink forming gels during manufacture as compared to SBS. Styrene butadiene block copolymers are alternatively preferred when a cast tenter line is used in manufacturing a film when its higher clarity and lower haze are advantageous.

Elastomeric styrene block copolymers provide toughness and lower stiffness than would be obtained in the absence of the block copolymer. Elastomeric behavior is indicated by a property of tensile percent elongation at break of advantageously at least about 200, specifically at least about 220, more specifically at least about 240, most specifically at least about 260 and specifically at most about 2000, more specifically at most about 1700, most specifically at most about 1500 percent as measured by the procedures of ASTM D412 and/or ASTM D882. Industrially, most polymers of this type contain 10-80 wt % styrene. Within a specific type and morphology of polymer, as the styrene content increases the elastomeric nature of the block copolymer decreases.

The block copolymers desirably have a melt flow rate (MFR) of at least about 2, specifically at least about 4 grams per 10 minutes (g/10 min), specifically 20 g/10 min, and more specifically 30 g/10 min. Measure MFR according to ASTM method D1238 Condition G.

Preferred styrenic block copolymers include styrene-isoprene-styrene block copolymers ("SIS"), styrene-butadiene-styrene block copolymers ("SB S"), styrene-ethylene-propylene block copolymers ("SEP"), and hydrogenated styrenic block copolymer such as styrene-(ethylene butylene)-styrene block copolymers ("SEBS") (e.g., the SEBS commercially available from Kraton Polymers LLC under the trade designation KRATON™ 1657). Preferably, the styrenic block copolymer used in the tie layer is SBS.

In one embodiment, the styrene butadiene block copolymer has a radial or star block configuration with polybutadiene at the core and polystyrene at the tips of the arms. Such polymers are referred to herein as star styrene butadiene block copolymers and are within the skill in the art and commercially available from Chevron Phillips Chemical Co. under the trade designation K-Resin. These polymers contain about 27% butadiene or more in a star-block form and often feature a bimodal molecular weight distribution of polystyrene. The inner polybutadiene segments are of about the same molecular weight while the outer polystyrene segments are of different molecular weight. This feature facilitates control of polybutadiene segment thickness, to obtain improved clarity. For high clarity, the polybutadiene segment thickness is preferably about one-tenth of the wavelength of visible spectrum or less.

The ethylene-α-olefin copolymer has been described above as has the polyethylene and will not be detailed again. The polypropylene will be detailed below with reference to the layer 102.

If the elastomer is used, it is present in amounts of up to 50 wt %, specifically 10 to 30 wt %, based on the total weight of the tie layer 104. The tie-layer 104 each have a thickness of 1 to 20%, specifically 2 to 10%, specifically 3 to 8% and more specifically 4 to 6% of the total thickness of the multilayer film.

The first layer 102 comprises polypropylene. It may also optionally comprise an elastomer and polyethylene in addition to the propylene. The polypropylene is selected from random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), or a combination comprising at least one of the foregoing polypropylenes.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5-7% ethylene copolymerized with the propylene), however, can also be used in the TPO formulations disclosed herein. A complete discussion of various polypropylene polymers is contained in Modern Plastics Encyclopedia/89, mid October 1988 Issue, Volume 65, Number 11, pp. 86-92, the entire disclosure of which is incorporated herein by reference. The molecular weight and hence the melt flow rate of the polypropylene for use in the present invention varies depending upon the application. The melt flow rate for the polypropylene useful herein is generally from about 0.1 grams/10 minutes (g/10 min, measured as per ASTM D1238 at 230° C. and 2.16 kg) to about 100 g/10 min specifically 0.5 g/10 min to about 80 g/10 min, and specifically 4 g/10 min to about 70 g/10 min. The propylene polymer can be a polypropylene homopolymer, or it can be a random copolymer or even an impact copolymer (which already contains a rubber phase). Examples of such propylene polymers include VISTAMAX (made by Exxon Mobil), VERSIFY and INSPIRE (made by The Dow Chemical Co.), and PROFAX (made by Lyondell).

The first layer 102 may contain polypropylene in an amount of 40 to 100 wt %, specifically 50 to 90 wt %, based on the total weight of the first layer 102.

The first layer 102 may optionally contain an elastomer in an amount of up to 40 wt %, specifically 10 to 35 wt %, based on the total weight of the first layer. The elastomer can be an ethylene-α-olefin copolymer (which is already detailed above), a polyolefin elastomer (e.g., a propylene based elastomer), a vinyl aromatic block copolymer, or a combination thereof as detailed above. The first layer may also contain polyethylene in an amount of up to 40 wt %, specifically 10 to 35 wt %, based on the total weight of the first layer. The polyethylenes have been described above, and will not be detailed here again.

The first layer 102 has a thickness of 30 to 80%, specifically 40 to 70%, and more specifically 50 to 70%, based on the total thickness of the multilayered film 100. In an exemplary embodiment, the first layer has a thickness that is at least 50% of the total thickness of the multilayered film.

The second layer 106 comprises an ethylene ionomer or an acrylic acid ethylene copolymer or a combination thereof.

The acrylic acid ethylene copolymer is a polymer that can comprise repeat units in an amount of 5 to 50 wt %, specifically 10 to 20 wt %, and more specifically 12 to 15 wt %, by weight of a polar monomer such as acrylic acid, alkyl acrylic acid, or alkyl acrylate, or combinations thereof, based on the total weight of the ethylene copolymer. The alkyl group may comprise 1 to 20 carbon atoms. The remainder of the copolymer is an ethylene polymer. Ethylene polymers including ethylene-α-olefin copolymers (defined above) may be used in the acrylic acid ethylene copolymer or in the ethylene ionomers (detailed below).

Examples of such polar monomers include acrylic acid, methacrylic acid, ethacrylic acid, methyl acrylate, ethyl acrylate, methyl methacrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly (ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimethyl fumarate, vinyl acetic acid, vinyl acetate, vinyl propionate, or combinations thereof.

The ethylene copolymer may comprise up to 35 wt % of an optional comonomer such as carbon monoxide, sulfur dioxide, acrylonitrile; maleic anhydride, maleic acid diesters, (meth)acrylic acid, maleic acid, maleic acid monoesters, itaconic acid, fumaric acid, fumaric acid monoester, a salt of these acids, glycidyl acrylate, glycidyl methacrylate, and glycidyl vinyl ether, or combinations thereof.

In an embodiment, the acid moiety of an ethylene copolymer may be neutralized with a cation to produce an ionomer. The neutralization, for example, can be 0.1 to 100, specifically 10 to 90, specifically 20 to 80, and more specifically 20 to about 40 wt %, based on the total carboxylic acid content, with a metallic ion. The metallic ions can be monovalent, divalent, trivalent, multivalent, or combinations of two or more thereof. Examples include Li, Na, K, Ag, Hg, Cu, Be, Mg, Ca, Sr, Ba, Cd, Sn, Pb, Fe, Co, Zn, Ni, Al, Sc, Hf, Ti, Zr, Ce, or combinations thereof. If the metallic ion is multivalent, a complexing agent, such as stearate, oleate, salicylate, and phenolate radicals can be included.

The ionomer can also be a blend of an ionomer having a greater than 20% neutralization and, for example, an ethylene (meth)acrylic acid copolymer to achieve the desired degree of neutralization.

Examples of ethylene copolymers include ethylene/methyl acrylate (EMA), ethylene/ethyl acrylate (EEA), ethyl acrylate (EA), ethylene/butyl acrylate (EBA), ethylene/isobutyl acrylate/methacrylic acid, ethylene/methyl acrylate/maleic anhydride, ethylene/butyl acrylate/glycidyl methacrylate (EBAGMA) and ethylene/butyl acrylate/carbon monoxide (EBACO), and butylacrylate (BA). Examples of commercially available ethylene copolymers include those available from E. I. du Pont de Nemours and Company (DuPont), Wilmington, Del., carrying the trademarks of Surlyn®, Nucrel®, Appeel®, Bynel®, Elvaloy®, and Elvax®.

The second layer 106 can also comprise a metal foil, comprising aluminum, copper, tin, or gold. When the second layer comprises a metal, a preferred metal is aluminum foil.

The second layer 106 has a thickness of 5 to 80%, specifically 7 to 70%, and more specifically 10 to 60%, based on the total thickness of the multilayered film 100. In an exemplary embodiment, the first layer has a thickness that is at least 50% of the total thickness of the multilayered film.

Each layer of the multilayer film 100 may contain other additives such as waxes, antioxidants, antiozonants, mold release agents, biocides, thermal stabilizers, pigments, dyes, infrared absorption agents, ultraviolet stabilizers, or the like, or a combination comprising at least one of the foregoing additives.

One of more layers of the multilayer film can optionally comprise a wax that may reduce the melt viscosity in addition to reducing costs. Non-limiting examples of suitable waxes include petroleum waxes, polyolefin waxes such as low molecular weight polyethylene or polypropylene, synthetic waxes, paraffin and microcrystalline waxes having melting points from about 55 to about 110° C., Fischer-Tropsch waxes, or a combination comprising at least one of the foregoing waxes. In some embodiments, the wax is a low molecular weight polyethylene homopolymer or interpolymer having a number average molecular weight of about 400 to about 6,000 g/mole.

In further embodiments, each of the layers of the multilayer film can optionally comprise an antioxidant or a stabilizer. Non-limiting examples of suitable antioxidants include amine-based antioxidants such as alkyl diphenylamines, phenyl-α-naphthylamine, alkyl or aralkyl substituted phenyl-α-naphthylamine, alkylated p-phenylene diamines, tetramethyl-diaminodiphenylamine and the like; and hindered phenol compounds such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); octadecyl-3,5-di-t-butyl-4-hydroxycinnamate (e.g., IRGANOX™ 1076, commercially available from Ciba Geigy) and combinations thereof. Where used, the amount of the antioxidant in the composition can be up to about 1 wt %, specifically 0.05 to 0.75 wt %, specifically 0.1 to 0.5 wt %, based on the total weight of any particular layer.

In further embodiments, the compositions disclosed herein optionally can comprise an UV stabilizer that may prevent or reduce the degradation of the compositions by UV radiation. Non-limiting examples of suitable UV stabilizers include benzophenones, benzotriazoles, aryl esters, oxanilides, acrylic esters, formamidine carbon black, hindered amines, nickel quenchers, hindered amines, phenolic antioxidants, metallic salts, zinc compounds, or the like, or a combination comprising at least one of the foregoing UV stabilizers. Where used, the amount of the UV stabilizer in any particular layer can be from about greater than 0 to about 1 wt %, specifically 0.05 to 0.75 wt %, and specifically 0.1 to 0.5 wt %, based on the total weight of a particular layer.

In further embodiments, the compositions disclosed herein optionally can comprise a colorant or pigment. Any colorant or pigment known to a person of ordinary skill in the art may be used in the adhesion composition disclosed herein. Non-limiting examples of suitable colorants or pigments include inorganic pigments such as titanium dioxide and carbon black, phthalocyanine pigments, and other organic pigments such as IRGAZIN®, CROMOPHTAL®, MONASTRAL®, CINQUASIA®, IRGALITE®, ORASOL®, all of which are available from Ciba Specialty Chemicals, Tarrytown, N.Y. Where used, the amount of the colorant or pigment in any particular layer can be present in an amount of up to 10 wt %, specifically 0.1 to 5 wt %, and more specifically 0.5 to 2 wt %, based on the total weight of any particular layer of the multilayered film.

In one embodiment, in one method of manufacturing the film 100, the respective compositions for each of the layers 102, 104, and 106 of the multilayered film 100 is fed to a separate device in which it is subjected to shear, extensional and elongational forces. The device that exerts the foregoing forces on the composition can be conducted in an extruder (single screw or twin screw), a Henschel mixer, a Waring blender, a Buss Kneader, a Banbury, a roll mill (two or more rolls), high shear impeller disperser, dough mixer, or the like. The ingredients for any layer in the multilayered film may be dry mixed or solution blended in either a Henschel mixer, a Waring blender, a high shear impeller disperser, or the like, prior to being extruded.

In an exemplary embodiment, the composition for each of the respective layers are fed to separate extruders. The composition for the first layer 102 is fed to a first extruder, the composition for the tie layer 104 is fed to a second extruder, and the composition for the third layer 106 is fed to a third extruder. The compositions from the respective extruders are fed to a single die and are coextruded to form the multilayered film. The coextruded film is then blown to form a multilayered film of the desired thickness. In an embodiment, the multilayered film after being coextruded is laminated in a roll mill having two or more rolls.

In another embodiment, in another method of manufacturing the multilayered film, each layer may be extruded separately, and the extruded layers may then be formed into a laminate (such as extrusion lamination, thermal lamination, compression molding, adhesive lamination). The compression molding or lamination can be conducted in a roll mill, or in a compression molding press.

In another embodiment, in another method of manufacturing the multilayered film, two layers may be coextruded together and the coextruded layers may then be coated to the third layer or laminated with the third layer. The extrusion coating involves extruding resin from a slot die directly onto the moving web which may then passed through a nip consisting of a rubber covered pressure roller and a chrome plated cooling roll. The latter cools the molten film back into the solid state and also imparts the desired finish to the plastic surface. For example, the second layer 106 can be aluminum foil, layers 102 and 104 can be coated on aluminum foil through extrusion coating process.

As detailed above, a plurality of multilayered films may be laminated together to form a single multilayered film. When two or more multilayered films are laminated together, at least one of the common layers may be omitted if desired. For example, if two multilayered films are laminated together, then at least one of the second layers 106 may be omitted. Thus while a single multilayered film contains 3 layers, two multilayered films laminated together will contain 5 layers, and three multilayered films will contain 7 layers.

The multilayered films disclosed herein are advantageous in that the presence of a core layer that comprises polypropylene in the multilayered film provides it with improved stiffness, strong heat seal strength without interlayer delamination, high creep resistance, high temperature performance and oil/crease resistance and good optical clarity, which enables the multilayered film to be used in packaging, automobile panels, and the like. Depending upon their intended use, the multilayer film or sheet structures according to the present invention can be designed to meet certain performance requirements.

The multilayered films disclosed herein and the method of manufacturing the films are exemplified in the following examples.

EXAMPLES

Example 1

This example demonstrates the disclosed multilayered films and methods of manufacture thereof. These examples were also conducted to demonstrate the properties of the multilayered films over comparative multilayered films. The tests conducted on the film are detailed below.

The ingredients used in the various layers of the multilayered film (for this example and for succeeding examples) are detailed in Table 1 below.

TABLE 1

| Material | Description |
| --- | --- |
| CBC1 | 50/50 EP/iPP, 90 wt % C2 in EP, 6.0 MFR |
| Lotader 8840 | Glycidyl (GMA) methacrylate-ethylene copolymer, 5 MI, 8% GMA, Arkema |
| PRIMACOR 3440 | Acrylic acid ethylene copolymer, 10 MI, 9.7% AA, Dow Chemical |
| PRIMACOR 3150 | Acrylic acid ethylene copolymer, 11 MI, 3% AA, Dow Chemical |
| AFFINITY PL1850 | |
| ELVAX 265 | Ethylene acetate ethylene copolymer, 3MI, 28% VA, DuPont |
| PP D221 | Homo PP, 35 MFR, Dow Chemical |
| AMPLIFY 3801 | Ethylene ionomer, Na form, 1.3 MI, Acrylic acid content is 8.8% before neutralization |
| Irganox B225 | Antioxidant |

The crystalline block composite (CBC1) has properties shown in the Table 1A below.

TABLE 1A

| Example | MFR (230° C./ 2.16 kg) | Wt % PP from HTLC Separation | Mw Kg/mol | Mw/Mn | Total Wt % $C_2$ | Tm (° C.) Peak 1 (Peak 2) | Melt Enthalpy (J/g) | Crystalline Block Composite Index |
| --- | --- | --- | --- | --- | --- | --- | --- | --- |
| CBC1 | 6.0 | 17.6 | 116 | 2.73 | 48.5 | 129 (107) | 90 | ~0.620 |

The compounding of components of Table 1, impact modifier and compatibilizer was performed on a Haake Rheomix 3000 rotating at 50 revolutions per minute (RPM). The mixer is preheated to 190° C. the mixing is kept for 5 minutes after the ram is secured down. The formulations are shown in Table 2. Comparative film samples are identified with letters (See Samples A-E), while samples that exemplify the invention are identified with numerals (See Samples 1-2). The layer structure for comparative samples A-E and inventive samples 1-2 are shown in Table 2. The method of making the samples is detailed below and the properties of the comparative samples and the inventive samples are shown in Table 3.

TABLE 2

| Sample # | CBC1 (wt %) | Lotader 8840 (wt %) | PRIMACOR 3440 (wt %) | PRIMACOR 3150 (wt %) | Irganox B225 (wt %) |
| --- | --- | --- | --- | --- | --- |
| A | 76.8 | 20 | | | 0.2 |
| 1 | 61.8 | 35 | | | 0.2 |
| 2 | 46.8 | 50 | | | 0.2 |
| B | 76.8 | | 20 | | 0.2 |
| C | 61.8 | | 35 | | 0.2 |
| D | 48.8 | | 50 | | 0.2 |
| E | 61.8 | | | 35 | 0.2 |

The face-to-face bonded plaques used for T-peel adhesion force test were prepared by laminate, i.e. melt bonding two compression molded plaques of adherent pair. The compression molded plaque for melt bonding is 1-mm thick from which a peel specimen will be die cut and extracted for testing. It is desired that all peel specimens fail at the bonding zone so that a true adhesion force can be measured. It is also desired that the adhesion force has a minimum contribution from the bending force to which the specimen is subjected. Therefore the 1-mm thickness was selected to balance the tradeoff between minimizing tensile yielding of the layer during peel test (e.g., maximize thickness) and minimizing the bending force that the layers will be subjected to (minimize the thickness).

The sample preparation is detailed as follows:

1st step: compression mold individual plaque at 190° C. under 25000 pounds per square inch (psi) pressure, for 5 minutes.

2nd step: stack a pair, re-mold at 190° C. under 200 psi contact pressure for 10 minutes.

3rd step: The bonded plaques were conditioned in ASTM environment for 48 hours prior to peel test. The bonded plaque was cut into 25 mm by 250 mm strips, with about 75 mm long legs by a NAEF punch press.

T-Peel Test:

The test method used is a 180° peel strength measurement on a partially pre-peeled film with a constant stretching rate of 254 mm/min. All the measurements were conducted in a temperature controlled room at 23° C. The strip was gripped and peeled by an INSTRON Model 1122, made by INSTRU-MET Corporation. The INSTRON was operated with pneumatic grips, separating the two specimen legs at 180°, leaving the bonded area at 90° with each leg, starting from an initial distance between the two grips of about 50 mm, and using a constant separation speed of 254 mm/min. Each specimen is pulled for 75 mm. Stress-strain curves were recorded for 5 independent specimens per pair. Average Peak Load is reported as the average adhesion strength between marker at the beginning of the peel and the end at the highest load and averaged.

Table 3 shows the adhesion ratings.

TABLE 3

| Adhesion value (lbf/in) | Rating |
|---|---|
| No delamination | Excellent |
| >5 | Good |
| 1-5 | Fair |
| <1 | Poor |

The adhesion to different substrates, including PP D221m Ionomer 3801, PRIMACOR 3440 and Aluminum foil is summarized in Table 4. Inventive examples (Sample #1 and 2) show excellent adhesion to PP and Ionomer 3801. Additionally, Sample #1 shows good adhesion to PRIMACOR 3440, whereas Sample #2 shows excellent adhesion to PRIMACOR 3440 and good adhesion to aluminum foil. Comparative examples, i.e., Sample #s A-H, on the other hand, show sufficient adhesion either to PP or to ionomer 3801, but not to both.

TABLE 4

| | | | | | | Substrate | | | |
|---|---|---|---|---|---|---|---|---|---|
| Sample # | CBC1 (wt %) | Lotader 8840 | P-3440 | P-3150 | B225 | PP D221 | Ionomer 3801 | P-3440 | Aluminum foil |
| A | 76.8 | 20 | | | 0.2 | E* | P* | P | P |
| 1 | 61.8 | 35 | | | 0.2 | E | E | G | P |
| 2 | 46.8 | 50 | | | 0.2 | E | E | E | G |
| B | 76.8 | | 20 | | 0.2 | E | P | P | P |
| C | 61.8 | | 35 | | 0.2 | E | P | G | P |
| D | 48.8 | | 50 | | 0.2 | P | E | E | G |
| E | 61.8 | | | 35 | 0.2 | E | P | P | P |
| F | | CBC1 | | | | E | P | P | P |
| G | | PL1850 | | | | P | F* | G* | P |
| H | | ELVAX 265 | | | | P | F | G | E |

*E = Excellent; P = Poor; G = Good; F = Fair

What is claimed is:

1. A multilayer film comprising:
a first layer and a second layer; where the first layer that comprises polypropylene and wherein the second layer comprises an ethylene ionomer, an acrylic acid ethylene copolymer or a combination thereof; and
a tie layer; where the tie layer is disposed between the first layer and the second layer; the first layer being disposed on a first surface of the tie layer; the second layer being disposed on a second surface of the tie layer; where the second surface is oppositely disposed to the first surface; where the tie layer comprises a crystalline block composite and a carboxylated olefin copolymer; where the carboxylated-olefin copolymer is present in an amount of 30 to 60 weight percent, based on the total weight of the tie layer; and where the crystalline block composite comprises a crystalline ethylene based polymer, a crystalline alpha-olefin based polymer, and a block copolymer comprising a crystalline ethylene block and a crystalline alpha-olefin block, wherein the crystalline ethylene block of the block copolymer is the same composition as the crystalline ethylene based polymer in the crystalline block composite and the crystalline alpha-olefin block of the block copolymer is the same composition as the crystalline alpha-olefin based polymer of the crystalline block composite.

2. The multilayer film of claim 1, where the carboxylated olefin copolymer is a carboxylated ethylene copolymer or a carboxylated propylene copolymer.

3. The multilayer film of claim 1, where the carboxylated olefin copolymer is a glycidyl methacrylate ethylene copolymer.

4. The multilayer film of claim 1, where the carboxylated olefin copolymer comprises a carboxylated species in an amount of 0.05 to 20 wt %, based on the total weight of the carboxylated olefin copolymer.

5. The multilayer film of claim 1, where the tie layer further comprises an elastomer; and where the elastomer is a homogeneously branched ethylene-α-olefin copolymer, a polyolefin elastomer, a vinyl aromatic block copolymer, or a combination comprising at least one of the foregoing elastomers.

6. The multilayer film of claim 1, where the crystalline block composite has a melt flow ratio 0.1 to 30 dg/min, when measured as per ASTM D 1238 at 230° C. and 2.16 kilograms.

7. The multilayer film of claim 1, where the crystalline block composite comprises 5 to 95 weight percent crystalline ethylene blocks and 95 to 5 wt percent crystalline alpha-olefin blocks.

8. The multilayer film of claim 1, where the polypropylene is selected from the groups consisting of random copolymer polypropylene, impact copolymer polypropylene, high impact polypropylene, high melt strength polypropylene, isotactic polypropylene, syndiotactic polypropylene, or a combination comprising at least one of the foregoing polypropylenes.

9. The multilayer film of claim 1, where the acrylic acid ethylene copolymer is derived from the polymerization of acrylic acid, methacrylic acid, ethacrylic acid, methyl acrylate, ethyl acrylate, methyl methacrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimethyl fumarate, vinyl acetic acid, vinyl acetate, vinyl propionate, or combinations thereof with an ethylene polymer.

10. The multilayer film of claim 9, where the acrylic acid ethylene copolymer is neutralized with an ion; and where the ion comprises Li, Na, K, Ag, Hg, Cu, Be, Mg, Ca, Sr, Ba, Cd, Sn, Pb, Fe, Co, Zn, Ni, Al, Sc, Hf, Ti, Zr, Ce, or combinations thereof.

11. The multilayer film of claim 1, where the second layer comprises a metal foil; where the metal foil comprises aluminum, copper, gold or tin.

12. An article comprising the multilayer film of claim 1.

* * * * *